UNITED STATES PATENT OFFICE.

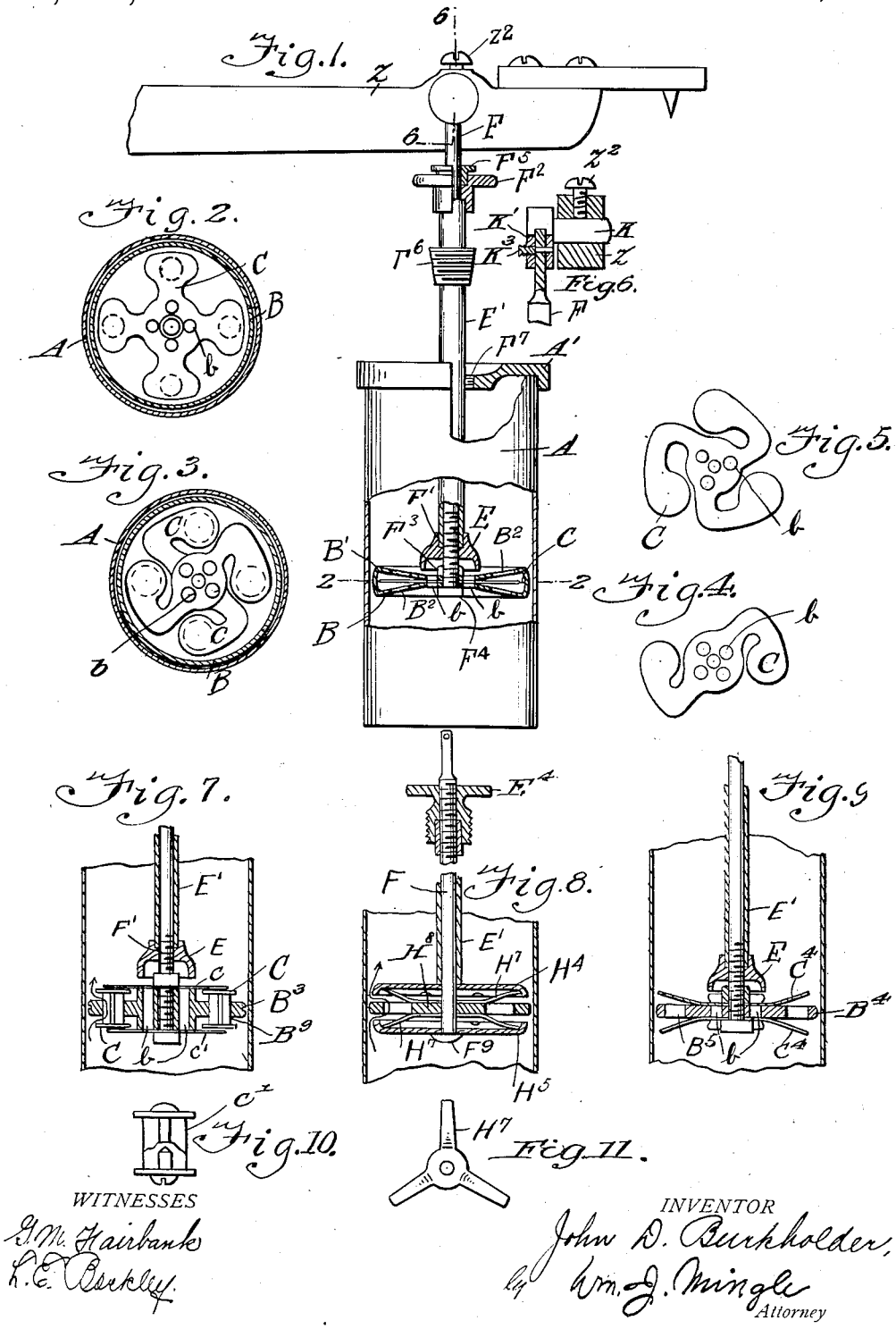

JOHN D. BURKHOLDER, OF LANCASTER, PENNSYLVANIA, ASSIGNOR, BY MESNE ASSIGNMENTS, TO TOLEDO SCALE COMPANY, OF TOLEDO, OHIO, A CORPORATION OF NEW JERSEY.

DASH-POT.

1,220,180. Specification of Letters Patent. Patented Mar. 27, 1917.

Application filed September 24, 1910. Serial No. 583,676.

*To all whom it may concern.*

Be it known that I, JOHN D. BURKHOLDER, a citizen of the United States of America, and resident of Lancaster, in the county of Lancaster and State of Pennsylvania, have invented certain new and useful Improvements in Dash-Pots, of which the following is a specification.

This invention relates to dash pots and is in its main features of general application where such devices may be used. It is, however, especially adapted to controlling the vibration of scales and in the accompanying drawing and specification it is specifically shown and described as applied to a scale for the purpose of illustration. As will appear, my invention invloves an improved form of dasher or piston in which the damping effect is controlled by manual adjustment and also automatically controlled in accordance with the violence or speed of the movement to which it is subjected. A further feature of my invention consists in the ready adjustment of the piston rod with reference to the movable part to which it is attached whereby the piston and rod may be readily centered in the cylinder of the dash pot. Other features will appear from the detailed description and following claims.

In the drawings in which I have illustrated certain preferred forms of my invention Figure 1 is a view partly in elevation and partly in vertical section of a dash pot attached to the beam of a scale, a fragment only of the beam being shown; Fig. 2 is a cross section through the piston on the line 2, 2 of Fig. 1; Fig. 3 is a view similar to Fig. 2 but showing a modification of one of the details; Fig. 4 shows a detail of the modification shown in Fig. 3 and Fig. 5 shows a further modification of this detail; Fig. 6 is a sectional view on the line 6—6 of Fig. 1; Figs. 7, 8 and 9 are vertical sections showing modified forms of plungers; Fig. 10 shows a slight modification of the valve shown in Fig. 7; Fig. 11 is a plan view of the spring shown in Fig. 8.

Referring more particularly to Figs. 1 and 2, Z represents the outer end of a scale beam which may be of any well known type. The cylinder of the dash pot is shown at A and is provided with a cover A' having an opening $F^7$ provided with internal screw threads for a purpose which will appear. The plunger, piston or dasher B is connected to the lever Z by means of a piston rod F which is screw threaded at its lower end and provided with nuts $F^3$, $F^4$ between which the members of the dasher head are clamped. At its upper end the piston rod F is received into a slot or kerf in a disk K' which is borne upon a trunnion K secured in a horizontal bore in the lever Z by means of a set screw $z^2$. The disk K' and rod F are perforated and the perforations alined to receive a screw pin $K^3$ by which the rod is secured to the disk. The kerf or slot is ample to permit a rocking of the rod F and the trunnion K is not only adjustable angularly with relation to the lever in which it is mounted but is adjustable longitudinally of the bore therein, whereby the piston rod and piston may be adjusted in all directions to secure proper alinement with the dash pot cylinder. In the particular modification shown in Fig. 1 the hollow piston head or dasher is formed in two sections, each of which is composed of an outwardly dished disk portion and a surrounding flange, the flanges of the two sections when secured together meeting in a common plane. Between the dished disks is clamped a flexible resilient member C, preferably of metal, and registering openings *b* are formed through the dasher sections and intermediate member near the center thereof for the passage of fluid. Above these openings is mounted a bell E which may be reciprocated or adjusted toward and from the dasher and openings by means of a sleeve E' having internal threads engaging the threads upon the rod F, though these threads may, if desired, be also formed upon the interior of the bell E. Upon its upper end the sleeve E' is provided with a hand nut $F^2$ rigid therewith by which the sleeve may be turned to adjust the bell E. The hand nut $F^2$ is provided with a packing gland $F^5$ to prevent the passage of the liquid from the dash pot between the rod F and the sleeve. At a point intermediate the ends and the bell the sleeve carries an externally threaded plug $F^6$ which may be engaged with the threaded opening $F^7$ in the top of the dash pot when it is desired to ship or transfer the device in which the dash pot is embodied to prevent oil escaping in case of the inversion of the dash pot. The upper and lower walls of the hollow piston are provided with openings $B^2$ through which the liquid in the dash pot surges as the piston is raised and lowered, the flexible valve or closure member C being of smaller diameter than the interior of the piston head to permit the liquid to flow around the same. It will be apparent that if the movement of the piston in the cylinder is slow and gentle there is a substantially free passage through the openings B² and around the flexible member C. If, however, the motion is more violent the flow of the liquid bends the flexible member back to a position in which it restricts the flow through the openings in the contiguous wall of the piston, and the amount of this flexure varies with the speed or violence of the movement of the piston so that the choking effect is augmented as the speed of the piston increases. For this reason the device is quickly brought to rest, no matter what the violence of the original movement. There is thus provided not only means for manual control but means dependent for its operation upon the violence of the movement to be controlled. In Fig. 2 I have shown the piston head as provided with four openings B² shown in dotted lines and the flexible blade C is correspondingly shaped to co-act with all of the openings. It will be obvious that a greater or lesser number of openings can be employed without departing from my invention. Thus, in Figs. 4 and 5 I have shown a flexible plate adapted to control two and three openings, respectively, or if desired the plate shown in Fig. 4 may be paired with another of the same kind and the pair used to control four openings as shown in Fig. 3. The plunger illustrated in Figs. 1–6 is the preferred form of my device, but a large variety of modifications thereof may be adopted. For example, in Fig. 7 I have shown a section of a dash pot cylinder with a piston therein, the latter consisting of a single rigid member B³ connected to the piston rod and provided with a series of openings B⁹ for the passage of fluid. Within these openings are mounted valves C' having disks at their ends connected by suitable webs. Upon either side of the piston head B³ is mounted a spring c' clamped to the piston head by nuts. Through the piston head and springs are formed registering passages b' for the passage of the fluid, which passages are controlled by the bell E as in the device as shown in Fig. 1. The valves C' are normally held in their intermediate position by the springs c', thus permitting a free passage of liquid through the openings in the head B³. When, however, a sudden movement is imparted to the piston, the resistance offered by the liquid causes the valves C' to be shifted and the valve heads approaching the piston head B³ serve to restrict the flow of liquid therethrough. Fig. 8 shows yet another modification. In this construction the lower end of the valve rod F carries a pair of disks H⁴, H⁵ held between the head F⁹ and the lower end of the sleeve E', the upper end of which is provided with a hand nut E⁴ which engages with a thread upon the upper end of the rod F. The disks H⁴, H⁵ are spaced a distance apart and provided with inwardly turned flanges and between said disks is arranged a disk H⁸ loosely mounted upon the rod F and normally held in an intermediate position between the disks by means of trifoliate springs H⁷ upon opposite sides thereof, which springs engage the adjacent faces of the disks H⁴, H⁵. The intermediate disk is provided with openings and loosely fits the interior of the cylinder, but the outside disks H⁴ and H⁵ are of somewhat smaller diameter whereby when the disks are in their normal position the liquid may readily pass around the outer disks and through the openings in the intermediate disk. When, however, the piston is violently moved in either direction the central disk is correspondingly shifted by the resistance of the liquid and chokes the passage around the adjacent disk. In Fig. 9 I have shown a further modification. In this form of the device a rigid head B⁴ is provided with openings B⁵ and is flanked on either side by a spring metal plate C⁴ dished to provide a free passage around the periphery of the same and through the ports in the head B⁴. As in the modification shown in Figs. 1 and 7 there are also provided ports b, the passage of liquid through which is controlled by the bell E. Obviously any violent motion of the piston is resisted by the liquid which causes one of the spring plates to flatten out and check the flow through the openings in the rigid head. It will be seen that in each modification I have provided the piston with a by-pass either therethrough or around the edge thereof or both, which passage may be controlled in part by hand and in part automatically to throttle or check the rush of liquid therethrough or therearound. But in its broadest aspect my invention is not limited to any specific form as will appear by the following claims.

I claim—

1. In a weighing machine, a movable member, a dash pot, said dash pot having a piston and a piston rod, a journal partially rotatable in the movable member, and means for connecting the journal to the piston rod.

2. In a weighing machine, a movable member, a dash pot, said dash pot having a piston and a piston rod, a journal partially rotatable in the movable member, a head on the journal, said head having a slot therein, the piston rod having an extension lying in the slot of the head, and means for securing the piston rod to the head.

3. In a weighing machine, a movable member, a dash pot, said dash pot having a piston and a piston rod, a journal partially rotatable in the movable member, means for directly connecting the journal to the piston rod, and means in the movable member for holding the journal.

4. In a device of the class described, a cylinder, a piston movable therein and provided with a plurality of openings, manually operated means for controlling the flow through certain of the openings and spring-pressed means operated by the flow of liquid for controlling the flow through other of the openings.

5. The combination of a movable member, a disk angularly adjustable with relation thereto, a dash pot, a piston and piston rod, the latter eccentrically attached to the disk, and means for securing the disk in adjustable position.

6. In a device of the class described, a movable member, a trunnion mounted therein and adjustable longitudinally and angularly with reference thereto, a disk carried by the trunnion and slotted to receive the upper end of a piston rod, a dash pot, a piston and piston rod therefor, the upper end of the latter entering the slot in the disk and pivoted therein.

7. In a device of the class described, a cylinder, a piston reciprocable therein and having two sets of openings, spring members for one set of openings normally maintained spaced from the latter but movable toward the same under pressure and a member adapted to be manually adjusted toward and from the other set of openings to control the flow of liquid therethrough.

8. In a device of the class described, a cylinder, a piston therein provided with a set of openings, a threaded piston rod, an obstructing member E coöperating with the set of openings and threaded upon the piston rod, a sleeve secured to said member surrounding the piston rod and extending outside the cylinder, and a stuffing box on said sleeve.

9. In a device of the class described, a cylinder open at one end, a closure for the open end of the cylinder having a threaded aperture therein, the wall of this aperture being tapered, an apertured piston movable in the cylinder, a piston rod connected to the piston and extending through the aperture in said closure, a rotatable sleeve surrounding the piston rod, and an externally threaded plug surrounding said sleeve, the outer wall of said plug being tapered to conform with the wall of the aperture in said closure.

In testimony whereof I have hereunto affixed my signature in the presence of two witnesses.

JOHN D. BURKHOLDER.

Witnesses:
W. J. MINGLE,
ADAM DELLET.